United States Patent
Michalopoulos et al.

(10) Patent No.: US 12,273,847 B2
(45) Date of Patent: Apr. 8, 2025

(54) METHOD FOR RAPID LOCATION REPORTING BETWEEN UE AND BASE STATION

(71) Applicant: Nokia Technologies Oy, Espoo (FI)

(72) Inventors: Diomidis Michalopoulos, Munich (DE); Andreas Maeder, Würzburg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 401 days.

(21) Appl. No.: 17/635,191

(22) PCT Filed: Sep. 4, 2020

(86) PCT No.: PCT/IB2020/058267
§ 371 (c)(1),
(2) Date: Feb. 14, 2022

(87) PCT Pub. No.: WO2021/059059
PCT Pub. Date: Apr. 1, 2021

(65) Prior Publication Data
US 2022/0295441 A1    Sep. 15, 2022

Related U.S. Application Data

(60) Provisional application No. 62/906,411, filed on Sep. 26, 2019.

(51) Int. Cl.
*H04W 64/00* (2009.01)

(52) U.S. Cl.
CPC .................................. *H04W 64/00* (2013.01)

(58) Field of Classification Search
CPC ..... H04W 64/00; H04W 92/10; H04W 80/02; H04W 92/20; H04W 4/024; H04W 4/70;
(Continued)

(56) References Cited

U.S. PATENT DOCUMENTS 10,506,543 B1 * 12/2019 Edge et al. ........... H04W 64/00
2007/0273583 A1 * 11/2007 Rosenberg .................... 342/367
(Continued)

FOREIGN PATENT DOCUMENTS

BR    122017010678 A2 *  9/2019
CN       102883269 A  *  1/2013
(Continued)

OTHER PUBLICATIONS

Office Action received for corresponding Chinese Patent Application No. 202080067548.1, dated Dec. 26, 2023, 9 pages of Office Action and no page of translation available.
(Continued)

*Primary Examiner* — Meless N Zewdu
(74) *Attorney, Agent, or Firm* — Lippes Mathias LLP (57) ABSTRACT

In accordance with an example embodiment of the present invention, a method comprising: receiving a request by a first device from a second device; and in response to receiving the request, transmitting by the first device location information regarding a location of the first device to the second device, where the request is received by the first device with a MAC control element and/or the location information is transmitted by the first device with another MAC control element.

19 Claims, 5 Drawing Sheets

(58) Field of Classification Search
CPC ....... H04W 4/02; H04W 4/025; H04W 4/029; H04W 4/023; H04W 88/00; H04W 88/02; H04W 88/08; H04W 88/18; H04W 92/00; H04W 92/16; H04W 76/00; H04W 76/10; H04W 76/27; H04W 76/15; H04W 74/00; H04W 74/0833; H04W 74/002; H04W 74/006; H04W 72/00; H04W 72/02; H04W 72/20; H04W 72/1273; H04W 48/10; H04W 48/12; H04W 48/08; H04W 8/00; H04W 8/08; H04L 9/0872; H04L 67/51; H04L 67/52

See application file for complete search history.

(56) References Cited

U.S. PATENT DOCUMENTS

| | | | |
|---|---|---|---|
| 2010/0195536 A1* | 8/2010 | Lee et al. | 370/254 |
| 2011/0053613 A1 | 3/2011 | Zhou et al. | |
| 2013/0122914 A1* | 5/2013 | Fukuta | H04W 64/003 |
| 2013/0143589 A1* | 6/2013 | Huang | 455/456.1 |
| 2014/0179345 A1* | 6/2014 | Gunnarsson et al. | H04W 4/02 |
| 2015/0024788 A1* | 1/2015 | Jung et al. | H04W 4/02 |
| 2015/0163837 A1 | 6/2015 | Li et al. | |
| 2015/0296522 A1 | 10/2015 | Bergström et al. | |
| 2015/0304180 A1* | 10/2015 | Gloss et al. | H04L 43/045 |
| 2016/0073236 A1* | 3/2016 | Kim et al. | H04W 4/023 |
| 2016/0227370 A1* | 8/2016 | Gunnarsson et al. | H04W 4/023 |
| 2017/0078984 A1 | 3/2017 | Uemura et al. | |
| 2017/0285177 A1 | 10/2017 | Jin et al. | |
| 2018/0042037 A1 | 2/2018 | Jin | |
| 2018/0054702 A1* | 2/2018 | Jordan | H04W 4/02 |
| 2019/0037339 A1* | 1/2019 | Liu et al. | H04W 4/02 |
| 2019/0166516 A1 | 5/2019 | Kim et al. | |
| 2020/0053638 A1* | 2/2020 | Edge et al. | H04W 48/16 |
| 2020/0068472 A1* | 2/2020 | Kumar et al. | H04W 36/24 |

FOREIGN PATENT DOCUMENTS

| | | | |
|---|---|---|---|
| CN | 107465443 A | * | 12/2017 |
| CN | 108242990 A | | 7/2018 |
| CN | 108632891 A | | 10/2018 |
| CN | 109076382 A | | 12/2018 |
| CN | 109246705 A | | 1/2019 |
| CN | 109803362 A | | 5/2019 |
| CN | 0099382 A | * | 8/2019 |
| CN | 110651512 A | * | 1/2020 |
| CN | 112806038 A | * | 5/2021 |
| EP | 2469945 A1 | * | 6/2012 ............ H04L 29/12 |
| JP | 2015231226 A | * | 12/2015 |
| JP | 2018503311 A | * | 2/2018 |
| KR | 20110023789 A | * | 3/2011 |
| KR | 20190022322 A | | 3/2019 |
| KR | 102215815 B1 | * | 2/2021 |
| WO | WO 2014017869 A1 | * | 1/2014 |
| WO | 2017/196152 A2 | | 11/2017 |
| WO | WO 2019184728 A1 | * | 10/2019 |

OTHER PUBLICATIONS

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"5G; NG Radio Access Network (NG-RAN); Stage 2 functional specification of User Equipment (UE) positioning in NG-RAN (3GPP TS 38.305 version 15.1.0 Release 15)", ETSI TS 138 305, V15.1.0, Oct. 2018, 62 pages.

"3rd Generation Partnership Project; Technical Specification Group Services and System Aspects; Study on Enhancement to the 5GC LoCation Services (Release 16)", 3GPP TR 23.731, V16.0.0, Dec. 2018, pp. 1-170.

International Search Report and Written Opinion received for corresponding Patent Cooperation Treaty Application No. PCT/IB2020/058267, dated Nov. 5, 2020, 12 pages.

"Local NR positioning in NG-RAN", 3GPP TSG-RAN WG3 Meeting #105, R3-193586, Agenda: 26.2, Qualcomm Incorporated, Aug. 26-30, 2019, pp. 1-31.

"UE reporting for eNodeB resource allocation", 3GPP TSG-RAN WG1 #85, R1-164422, Agenda: 6.2.2.3.2, Qualcomm Incorporated, May 23-27, 2016, 2 pages.

Office action received for corresponding European Patent Application No. 20771361.1, dated Apr. 4, 2024, 5 pages.

Office Action received for corresponding Chinese Patent Application No. 202080067548.1, dated May 11, 2024, 8 pages of Office Action and no page of translation available.

Notice of Allowance received for corresponding Chinese Patent Application No. 202080067548.1, dated Jul. 15, 2024, 5 pages of Notice of Allowance and no page of translation available.

"Radio Interface Specifications for IMT-2000", Technical Specification Group, Radio Access Network, TSGR#3(99)249, ITU Ad Hoc, Apr. 21-23, 1999, pp. 1-8.

Office Action received for corresponding Indonesian Patent Application No. P00202204063, dated Aug. 20, 2024, 2 pages of Office Action and 2 pages of translation available.

* cited by examiner

Fixed size Rapid Location Reporting Activation/Deactivation MAC CE

METHOD FOR RAPID LOCATION REPORTING BETWEEN UE AND BASE STATION

RELATED APPLICATION

This application claims priority to PCT Application No. PCT/IB2020/058267 filed Sep. 4, 2020 which claims priority benefit from U.S. Application No. 62/906,411, filed Sep. 26, 2019 each of which is incorporated herein by reference in its entirety.

TECHNICAL FIELD

The example and non-limiting embodiments relate generally to location reporting and, more particularly, to location reporting using a MAC layer.

SUMMARY

Various aspects of examples of the invention are set out in the claims.

According to a first aspect of the present invention, a method comprising: receiving a request by a first device from a second device; and in response to receiving the request, transmitting by the first device location information regarding a location of the first device to the second device, where the request is received by the first device with a MAC control element and/or the location information is transmitted by the first device with another MAC control element.

According to a second aspect of the present invention, an apparatus comprising: at least one processor; and at least one memory including computer program code, wherein the at least one memory and the computer program code are configured, with the at least one processor, to cause the apparatus to at least: receive a request from a second device; and in response to receiving the request, transmit location information regarding a location of the apparatus to the second device, where the request is received by the apparatus with a MAC control element and/or the location information is transmitted by the apparatus with another MAC control element.

According to a third aspect of the present invention, A non-transitory computer storage medium encoded with a computer program, the program comprising instructions that when executed by one or more computers cause the one or more computers to perform operations comprising: receiving a request by a first device from a second device; and in response to receiving the request, transmitting by the first device location information regarding a location of the first device to the second device, where the request is received by the first device with a MAC control element and/or the location information is transmitted by the first device with another MAC control element.

According to a fourth aspect of the present invention, an apparatus comprising: means for receiving a request from a second device; and in response to receiving the request, means for transmitting location information regarding a location of the apparatus to the second device, where the request is received by the apparatus with a MAC control element and/or the location information is transmitted by the apparatus with another MAC control element.

According to a fifth aspect of the present invention, a method comprising: transmitting a request by a first device to a second device; and receiving by the first device from the second device, in response to the request, location information regarding a location of the second device, where the request is transmitted by the first device with a MAC control element and/or the location information is received by the first device with another MAC control element.

According to a sixth aspect of the present invention, an apparatus comprising: at least one processor; and at least one memory including computer program code, wherein the at least one memory and the computer program code are configured, with the at least one processor, to cause the apparatus to at least: transmit a request to a second device; and receive from the second device, in response to the request, location information regarding a location of the second device, where the request is transmitted by the apparatus with a MAC control element and/or the location information is received by the apparatus with another MAC control element.

According to a seventh aspect of the present invention, A non-transitory computer storage medium encoded with a computer program, the program comprising instructions that when executed by one or more computers cause the one or more computers to perform operations comprising: transmitting a request by a first device to a second device; and receiving by the first device from the second device, in response to the request, location information regarding a location of the second device, where the request is transmitted by the first device with a MAC control element and/or the location information is received by the first device with another MAC control element.

According to a eighth aspect of the present invention, an apparatus comprising: means for transmitting a request to a second device; and means for receiving from the second device, in response to the request, location information regarding a location of the second device, where the request is transmitted by the apparatus with a MAC control element and/or the location information is received by the apparatus with another MAC control element.

BRIEF DESCRIPTION OF DRAWINGS

For proper understanding of example embodiments, reference should be made to the accompanying drawings, wherein.

DETAILED DESCRIPTION OF EMBODIMENTS

Figure 1:
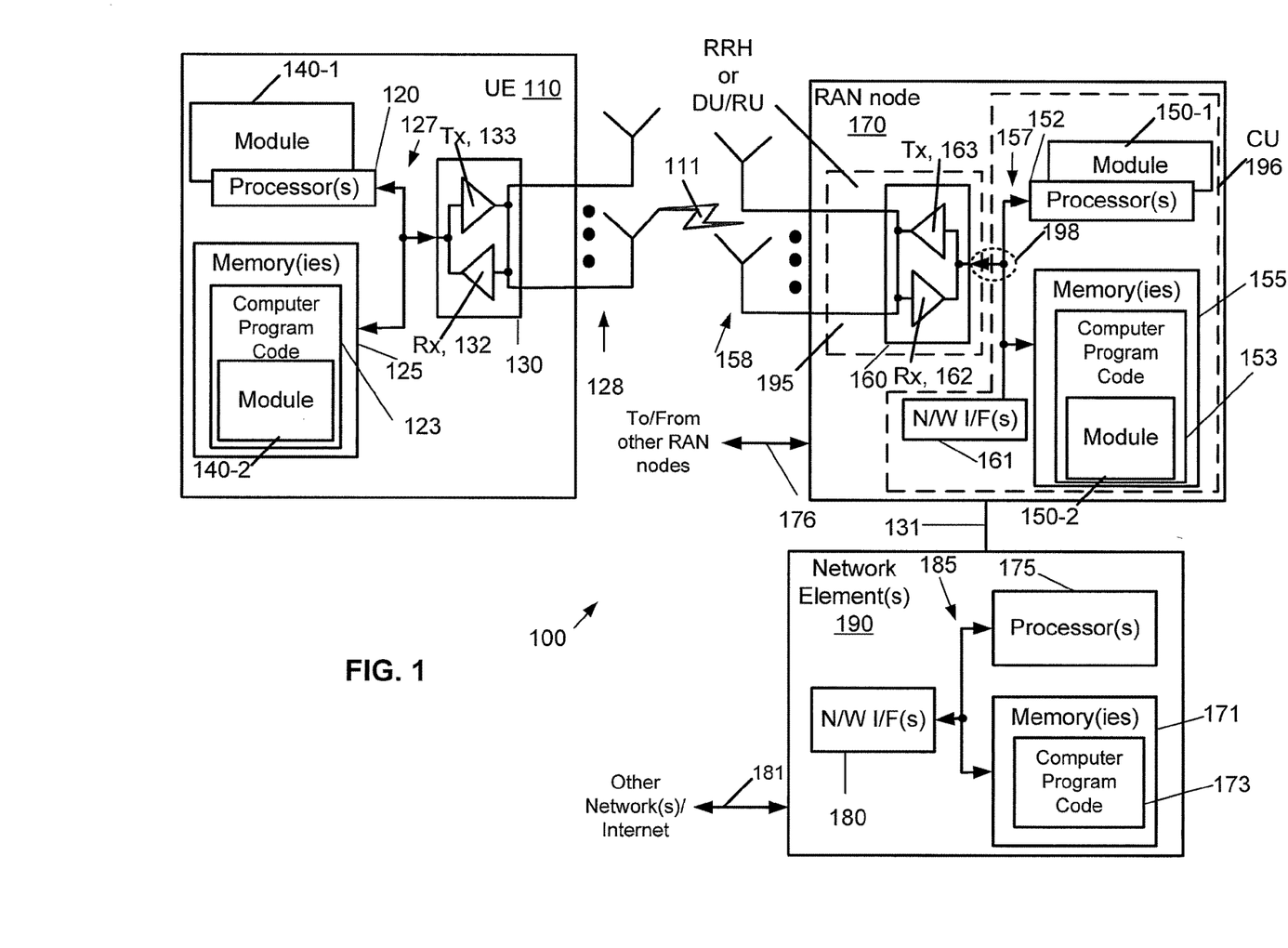
FIG. 1 illustrates a block diagram of one possible and non-limiting example in which the example embodiments may be practiced.

The following abbreviations that may be found in the specification and/or the drawing figures are defined as follows:
3GPP third generation partnership project
3GPP TS 3GPP Technical Specification
5G fifth generation
5GC 5G core network
AMF Access and Mobility management Function CE Control Element
CN Core Network
CP Control Plane
CRNTI Cell Radio Network Temporary Identifier
CU Central Unit
DL-SCH Downlink Shared Channel
DU Distributed Unit
F1AP F1 Application Protocol
gNB-CU-CP gNB Central Unit Control Plane
gNB-DU gNB Distributed Unit
GNSS-RTK Global Navigation Satellite System—Real-Time-Kinetics
IoT Internet of Things
LCID Logical Channel ID
LMC Location Management Component
LMF Location Management Function
MAC Medium Access Control
MAC CE MAC Control Element
MgNB Master gNB
SgNB Secondary gNB
PDCP Packet Data Convergence Protocol
PDU Packed Data Unit
RAN Radio Access Network
RG Reliability Group
RLR Rapid Location Reporting
RRC Radio Resource Control
RRM Radio Resource Management
RSRP Reference Signal Received Power
SMF Session Management Function
UL-SCH Uplink Shared Channel
UP User Plane
UPF User Plane Function
URLLC Ultra-Reliable Low-Latency Communication
XnAP Xn Application Protocol Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless, typically a mobile device, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
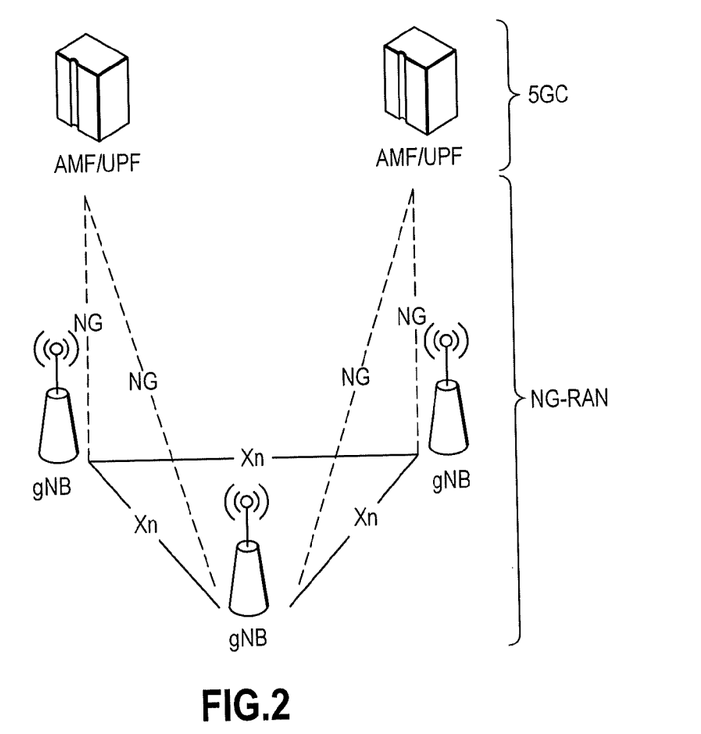
FIGS. 2-3 illustrate an example of New Radio (NR) architecture having the 5G core (5GC) and the NG-RAN.
Figure 3:
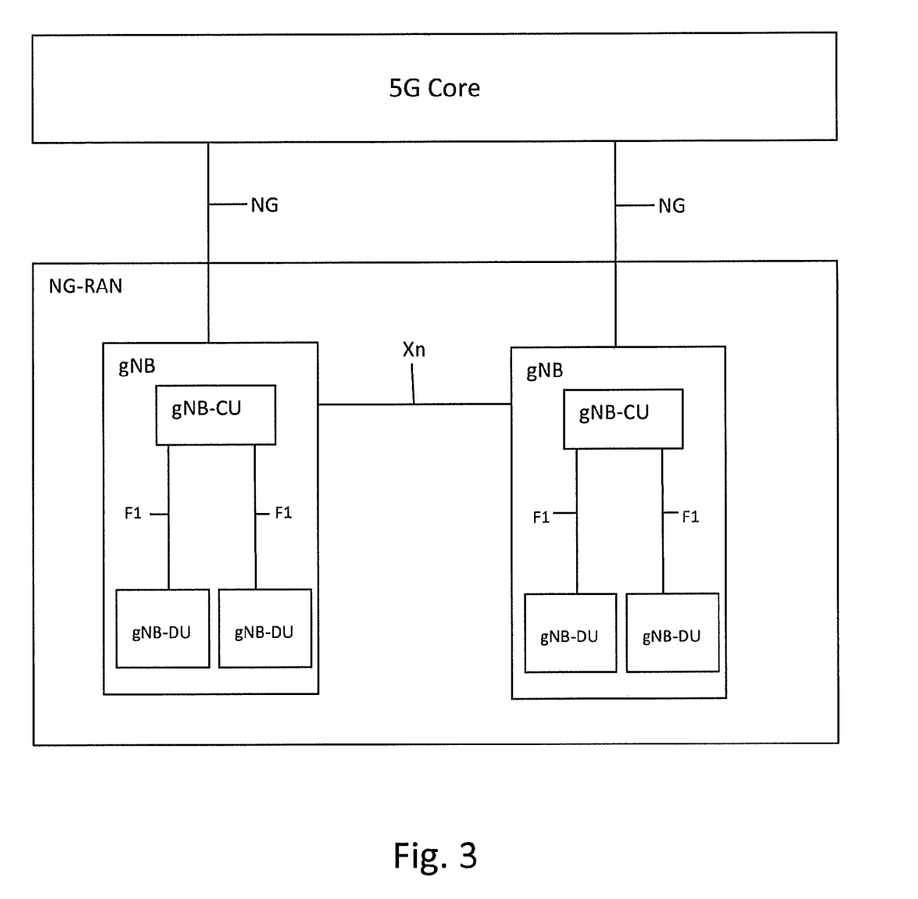

FIGS. 2-3 shows an example of New Radio (NR) architecture having the 5G core (5GC) and the NG-RAN. The base stations gNB are coupled to the 5GC by the interface to Core NGs, and the gNBs are coupled to each other by the inter-base stations interface Xn. One of the main requirements of industrial IoT use cases is support for location services with low latency and rapid update rates. Recent developments in positioning technologies make it possible to reach 1 cm accuracy with update rates up to 100 Hz, such as 10 times per second for example. One of the enabling technologies are Global Navigation Satellite System—Real-Time-Kinetics (GNSS-RTK), which uses positioning correction signals combined with carrier-phase tracking to reach these very good performance values.

Location information of this quality can be exploited in various ways by a mobile network, such as for improving radio resource management, beam management, and predictive hand-over for example. It can also be used for applications with control or processing functions in the network (or co-located with the network), such as vehicle platooning or augmented reality, which require high update rates combined with high accuracy for a proper service level.

Features as described herein may use MAC-layer mechanisms to provide a rapid location service between a UE and a base station, allowing for extremely low latency and high update rates. This may use a RAN architecture split scenario, where the RAN architecture is split into the central unit (CU) and the distributed unit (DU), where the CU hosts the upper layers of the protocol stack (namely, PDCP at the data plane and RRC at the control plane), while the DU hosts the lower layers (such as RLC, MAC, and PHY).

Figure 4:
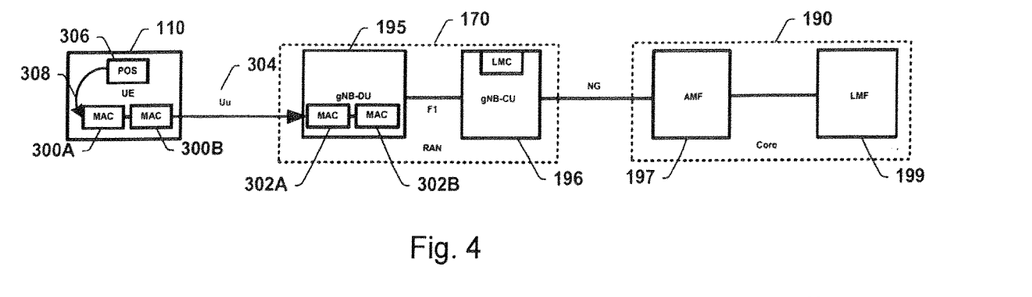
FIG. 4 illustrates a block diagram of one possible and non-limiting example according to an embodiment.

Referring also to FIG. 4 a diagram is shown to help illustrate features as described herein. FIG. 4 shows the UE 110, the RAN 170 and the core 190. The RAN 170 comprises the DU 195 and the CU 196. The core 190 comprises the Access and Mobility management Function (AMF) 197 and Location Management Function (LMF) 199. In this example, the DU is a consumer of UE-provided location information.

Features as described herein may be used for the establishment of a direct communication exchange between MAC layer for positioning purposes. The MAC layer may possibly be located in the DU part of a gNB and the UE as illustrated by 300A, 300B, 302A, 302B, 304 in FIG. 4. With features as described herein, the MAC may acquire directly from the UE 110, as indicated by arrow 308, the location information 306 of the UE 110. The UE may have already estimated its location with the use of RAT-independent methods, such as GNSS-RTK for example.

Thus, with features as described herein, a MAC-based rapid location reporting service between a UE and a network may be used. With the example shown in FIG. 4, due to the elimination of additional hops and processing, such as between RAN 170 and core 190, and/or between DU 195 and CU 196, the example method enables much faster communication with less signaling overhead between the respective entities. This may be used for a direct signaling exchange that provides to the DU 195 the location of the UE 110 in a rapid manner.

To achieve the direct signaling exchange for positioning purposes, the communication between the gNB-DU or base station and the UE may be established by means of the MAC Control Elements (MAC CE) conveying a location request and conveying corresponding location response information. That is, in addition to existing MAC CE, a new MAC CE may be used in a Downlink Shared Channel (DL-SCH) to indicate a request to the UE 110 of UE coordinates. The coordinates of the UE 110 may then be transferred by the UE 110 directly to the DU 195 with the new form of MAC CE in the UL-SCH.

As an overview, an example method may comprise the following:
Setup of rapid location reporting configuration between MAC entities by RRC protocol. This may include parameters pertaining to the reporting rate and the location information type. The setup may be based on device capabilities for this feature, which may include the supported maximum update rate and the supported location information types.
Activation and de-activation of rapid location reporting by using a new MAC CE, referred to as Rapid Location Reporting Activation/Deactivation MAC CE. It may include the location reporting rate, as well a selector for the location information type. Activation may be based on trigger conditions, such as to estimate mobility trajectories for predictive beam switching for example.
The reporting MAC entity (in the UE 110) may send location information using the new MAC Location Reporting CE.
In case of a hand-over, service continuity may be achieved. In a case of a RAN logical split, the DU may send the status and configuration of rapid location reporting to the target, along with the last received location information which can be used for RRM optimization. The information from a gNB-DU to a gNB-CU-CP may be sent via F1AP, and then via Xn or X2 to the target node.

The procedure of using positioning information exchange over a MAC CE may be activated in a situation or case where the MAC needs to rapidly obtain the location of a certain UE. The rapid location reporting MAC CE may then be represented as part of the DL-SCH control elements (conveying the positioning request), as well as the UL-SCH control elements (conveying the location information from UE to gNB-DU).

Figure 5:
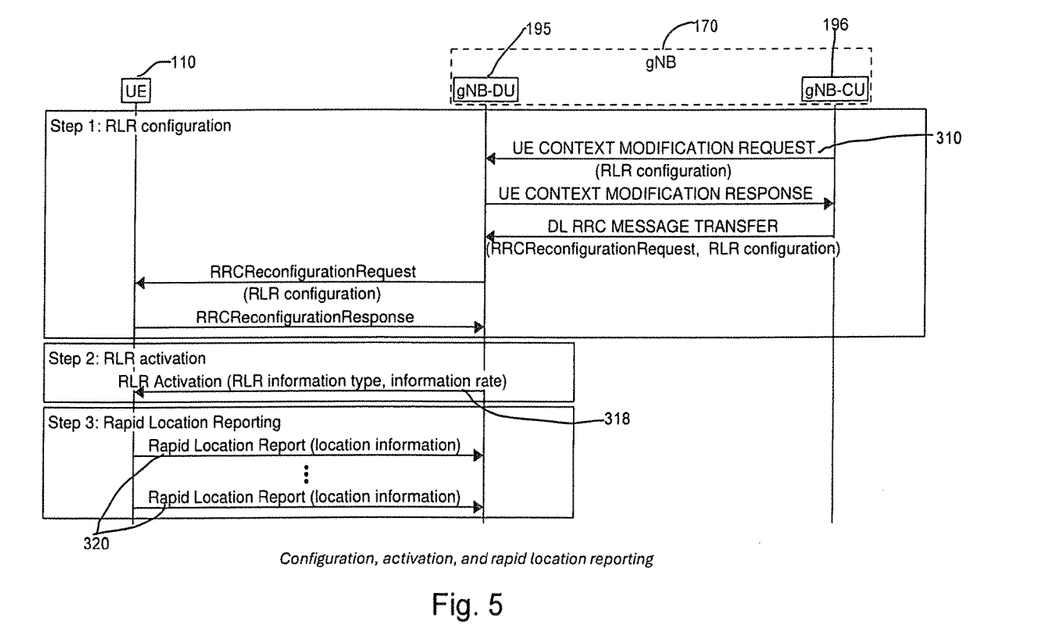
FIG. 5 illustrates an example of a signaling process according to an embodiment.

Referring also to FIG. 5, a diagram is shown which illustrates an example of a signaling process (organized in a three-step process) associated with a configuration, activation, and rapid location reporting service.

Step 1 comprises a setup of a rapid location reporting (RLR) configuration between MAC entities by RRC protocol. This includes parameters of the reporting rate and the location information type. The setup is based on device capabilities for this feature which includes the supported maximum update rate and the supported location information types.

As shown in FIG. 5, Step 1 represents the initialization phase where the MAC entities of the DU 195 and the UE 110 are configured by RRC to establish a signaling exchange procedure with given parameters for positioning purposes. The configuration may be carried out by RRC as illustrated with the following example:
Base station or gNB sends, in the RRC connection setup message, configuration parameters for the reporting rate of the location information, as well as the type of location information. The configuration may be based on UE capabilities which may be obtained during UE initial context setup. The UE may be configured to provide location information to MAC, which encodes and encapsulates the information into MAC CEs.
In the case of logical split at the base station 170, the gNB-CU-CP may use the UE CONTEXT MODIFICATION REQUEST message 310 in F1AP to accordingly set parameters in the gNB-DU.

FIG. 5 shows Step 2 comprising activation (or de-activation) as indicated by 318 of rapid location reporting by using the new MAC CE in the DL-SCH; referred to as Rapid Location Reporting Activation/Deactivation MAC CE. It may include the location reporting rate as well a selector for the location information type.
Based on the configuration obtained at Step 1, MAC may activate the rapid location reporting for a UE with the use of the new MAC CE (Rapid Location Reporting Activation/Deactivation MAC CE) based on one or more triggering condition such as, for example, if Reference Signal Received Power (RSRP) indicates that the UE is at a cell edge or between beam areas, or for estimation of mobility trajectories for predictive beam switching.
The new Rapid Location Reporting Activation/Deactivation MAC CE may be identified by a MAC subheader with a specific logical channel ID (LCID). The LCID Table specified in TS 38.321 may be updated accordingly in order to account for the Rapid Location Reporting Activation/Deactivation MAC CE.
The Rapid Location Reporting Activation/Deactivation MAC CE may convey the following information:
The location information type such as, for example, encoding of coordinates, positioning accuracy, and the positioning method used, such as GNSS-RTK for example.

The reporting rate of the location information.

Figure 6:
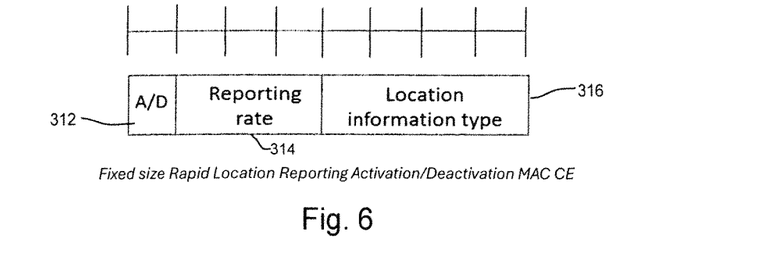
FIG. 6 illustrates an example of implementation of the new MAC CE according to an embodiment.

In one embodiment, the Rapid Location Reporting Activation/Deactivation MAC CE of request 318 has a fixed size, organized, for example, as shown in FIG. 6. FIG. 6 depicts only a non-limiting example implementation of the new MAC CE with octet one. Further extensions on the bit size allowing for larger information type and reporting rate codebooks are possible, resulting in sizes larger than one octet.

- The single-bit A/D field 312 in FIG. 6 may be used for indicating whether the rapid location request is activated or deactivated.
- The reporting rate field 314 may convey the information on the minimum rate the location information at the DU may need to be updated.
- The location information type field 316 may be used to request the specific information type from the UE.

In another embodiment, the Rapid Location Reporting Activation/Deactivation MAC CE may be a variable size; corresponding to variable location information type and reporting rate fields for example. The exact size of such fields may then depend on the rapid location request by the DU.

FIG. 5 shows Step 3 comprising the reporting in which the MAC entity (in the UE 110) sends location information using the new MAC Location Reporting CE. When the UE 110 encounters an activated Rapid Location Reporting Activation/Deactivation MAC CE indicating positioning request, the UE may retrieve the real-time coordinates from an application layer in the user equipment, and encode the information suitable for transmission in a MAC CE.

- The reporting 320 from the UE 110 may be realized by means of the new MAC CE, namely the Rapid Location Report MAC CE.
- The response 320 may be transferred via the UL-SCH, and associated to the requested location information type and reporting rate, as configured at Steps 1 and 2.
  - The LCID Table specified in TS 38.321 may be updated accordingly, in order to account for the Rapid Location Report MAC CE.
- Similarly as for the Rapid Location Reporting Activation/Deactivation MAC CE, the Rapid Location Reporting Response MAC CE at the UL-SCH may be of fixed size in one example embodiment, or a variable size in another example embodiment.

In regard to mobility and service continuity, such as in a situation or case of hand-over for example, service continuity may be achieved. In a case of a RAN logical split, the DU may send the status and configuration of rapid location reporting to the target along with the last received location information which may be used for RRM optimization. The information from DU to the CP may be sent via FLAP, and then via Xn or X2 to the target node. For a case of mobility, the signaling exchange allows for continuity of rapid location reporting between the respective entities.

In a case of intra-gNB mobility (where the gNB-DUs are under the same gNB-CU-CP), the F1AP protocol may be used between the respective gNB-DUs and gNB-CU-CP, in conjunction with the gNB-DU UE F1AP ID identifier at the source gNB-DU. The gNB-CU-CP may configure the target gNB-DU with the configuration information that the source gNB-DU was configured at Step 1. The source gNB-DU may use the gNB-DU UE F1AP ID to identify the UE location context information to be passed to the target gNB-DU. The source gNB-DU may also pass the latest received location information from the UE.

In a case of inter-gNB mobility (the gNB-DUs are under different gNB-CU-CPs), in addition to the above procedure:
- The XnAP protocol may be used in conjunction with the UE XnAP ID identifier for transferring to the target the location context information, the configuration parameters and the latest received location of the UE.
- This may be realized together with the mobility context transfer.
- RRC in target node may configure MAC using UE CONTEXT MODIFICATION REQUEST over F1AP.

Features described above may also be used for a reverse case. In a reverse case, where the UE requests and obtains the location information from the gNB-DU, a similar procedure as above may be followed. This refers to the case where the gNB-DU is equipped with a location management functionality, such as by means of a location management component agent for example. Such agent component may be an agent network element to the Location Management Component (LMC), located at the corresponding gNB-CU. The agent component may be able to set up a positioning session for a certain UE, and provide the location information to the interested UE upon request.

In some scenarios, radio resource management (RRM) needs to obtain an estimate of the location of given UE(s), i.e., RRM (located in MAC layer) is the consumer of location information from the UE. Examples of such scenarios are the cases of beam management and inter-cell mobility, which are controlled by MAC. In particular, in cases where a MAC layer does not have sufficient information from UE measurements due to either weak signals (e.g., close to cell edge) or long time-average filtering (e.g., in case the beam management function (BMF) the MAC needs to obtain a quick decision as of which beam to assign to a UE. However, if the UE takes too long to provide its measurements (such as due to long time filters applied for example), then location-based solutions are needed. Such location-based solutions imply that the assignment of beams to UEs is done based on the information that the BMF obtains regarding the actual location of the UE.

There is currently no mechanism standardized which allows to exploit the new techniques, such as GNSS-RTK for example, where the location is determined in the UE itself with high-accuracy, low-latency, and extremely high update rate. This needs an efficient mechanism which minimizes protocol latencies as well as overhead. This applies to the case where MAC is located at a monolith base station as well as in case of a disaggregated logical RAN deployment with CU/DU split. In order to support the latter case, the protocol endpoint may be located at the DU/MAC to avoid additional hops and latency over the CU and core network, as is the case in LTE Positioning Protocol (LPP)-based approaches.

Features as described herein address the above with use of a MAC-based rapid location reporting service between a UE and the network; allowing a DU/MAC layer to immediately acquire from the UE the location of the UE upon request. Previously, MAC control elements (MAC CE), were typically used for control information exchange between the MAC entities of the DU and the UE. The MAC CE conveyed information related to scheduling (such as buffer status and power headroom reports), random access related information (such as C-RNTI), timing-advance information, etc. However, with features as described herein, a direct positioning information exchange is allowed between MAC layers at the network and the UE side.

Figure 7:
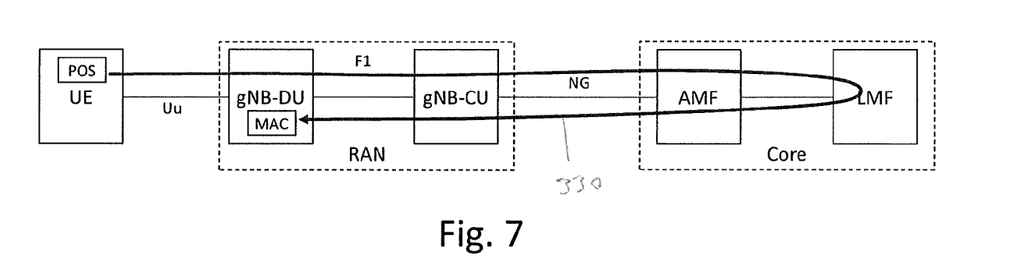
FIG. 7 illustrates a block diagram of implementation according to an embodiment.
Figure 8:
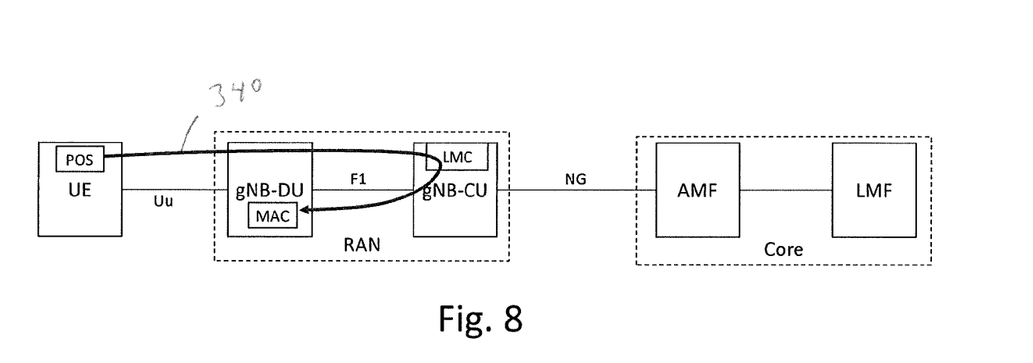
FIG. 8 illustrates a block diagram of implementation according to an embodiment.

Comparing FIG. 4 to alternatives shown in FIGS. 7 and 8, one can see the advantages as described herein. In the example shown in FIG. 7, core network-based location services are used where a location information session is established between the UE and a Location Management Function (LMF) at the core. The DU is the consumer of UE-provided location information without RAN-based location management. As can be seen in comparing FIG. 7 to FIG. 4, the method shown in FIG. 4 will provide faster communication with less signaling overhead between the respective entities with a much shorter path 304 than the path 330 shown in FIG. 7. In the example shown in FIG. 8, a location information session is handled at the gNB-CU part of the RAN, in the so-called Location Management Component (LMC); as currently under discussion in 3GPP (see, e.g., TR 23.731). The DU is the consumer of UE-provided location information with RAN-based location management. As can be seen in comparing FIG. 8 to FIG. 4, the method shown in FIG. 4 will provide faster communication with less signaling overhead between the respective entities with a much shorter path 304 than the path 340 shown in FIG. 8. With the example shown in FIG. 4, due to the elimination of additional hops and processing, such as between RAN 170 and core 190 as shown in FIG. 7, and/or between DU 195 and CU 196 as shown in FIG. 8, the example method enables much faster communication with less signaling overhead between the respective entities. This may be used for a direct signaling exchange that provides to the DU 195 the location of the UE 110 in a rapid manner.

With features as described herein, a new configuration of MAC CE may be provided. With features as described herein, a new method is provided where a base station (or distributed unit) may request location info using a separate MAC CE. With features as described herein, service continuity in a case of intra-gNB and a case of inter-gNB may also be provided.

In accordance with one example, a method is provided comprising: receiving a request by a first device from a second device; and in response to receiving the request, transmitting by the first device location information, regarding a location of the first device, to the second device, where the request is received by the first device with a MAC control element and/or the location information is transmitted by the first device with another MAC control element.

The first device may comprise a user equipment and the second device may comprise a radio access network node. The first device may comprise a radio access network node and the second device may comprise a user equipment. The request may be received by the first device on a downlink shared channel or an uplink shared channel. The location information may be transmitted on an uplink shared channel or a downlink shared channel. The request may comprise an activation trigger in a MAC subheader. The activation trigger may be a single bit. The request may comprise a reporting rate field identifying a minimum rate for the first device to update the location information. The request may comprise a location information type field identifying a specific information type for the first device to transmit in the location information. The MAC control element of the request may comprise a fixed size MAC control element. The MAC control element of the request may comprise a variable size MAC control element. The method may further comprise receiving by the first device a radio resource control reconfiguration request from the second device, where the radio resource control reconfiguration request comprises configuration information for the first device to establish a signaling exchange procedure with given parameters for positioning purposes. The method may further comprise transmitting by the first device to the second device a response to the radio resource control reconfiguration request. The method may further comprise the first device retrieving real-time coordinates from an application layer in the first device for use as the location information, and encoding the location information for transmission in the another MAC control element.

An example embodiment may be provided with an apparatus comprising: at least one processor; and at least one non-transitory memory including computer program code, the at least one memory and the computer program code configured to, with the at least one processor, cause the apparatus to: receive a request by the apparatus from a second device; and in response to receiving the request, transmit by the apparatus location information, regarding a location of the apparatus, to the second device, where the request is received by the apparatus with a MAC control element and/or the location information is transmitted by the apparatus with another MAC control element.

The apparatus may comprise a user equipment and the second device comprises a radio access network node. The apparatus may comprise a radio access network node and the second device comprises a user equipment. The apparatus may be configured to receive the request a downlink shared channel or an uplink shared channel. The apparatus may be configured to transmit the location information on an uplink shared channel or a downlink shared channel. The request may comprise an activation trigger in a MAC subheader. The activation trigger may be a single bit. The request may comprise a reporting rate field identifying a minimum rate for the first device to update the location information. The request may comprise a location information type field identifying a specific information type for the apparatus to transmit in the location information. The MAC control element of the request may comprise a fixed size MAC control element. The MAC control element of the request may comprise a variable size MAC control element. The apparatus may be configured to further receive a radio resource control reconfiguration request from the second device, where the radio resource control reconfiguration request may comprise configuration information for the apparatus to establish a signaling exchange procedure with given parameters for positioning purposes. The apparatus may be configured to transmit to the second device a response to the radio resource control reconfiguration request. The apparatus may be configured to retrieve real-time coordinates from an application layer in the apparatus for use as the location information, and encoding the location information for transmission in the another MAC control element.

An example embodiment may be provided in a non-transitory program storage device readable by a machine, tangibly embodying a program of instructions executable by the machine for performing operations, the operations comprising: cause receiving a request by a first device from a second device; and in response to receiving the request, cause transmitting by the first device location information, regarding a location of the first device, to the second device, where the request is received by the first device with a MAC control element and/or the location information is transmitted by the first device with another MAC control element.

An example embodiment may be provided in an apparatus comprising: means for receiving a request by a first device from a second device; and in response to receiving the request, means for transmitting by the first device location information, regarding a location of the first device, to the second device, where the request is received by the first device with a MAC control element and/or the location information is transmitted by the first device with another MAC control element.

An example method may comprise transmitting a request by a first device to a second device; and receiving by the first device from the second device, in response to the request, location information regarding a location of the second device, where the request is transmitted by the first device with a MAC control element and/or the location information is received by the first device with another MAC control element.

The first device may comprise a radio access network node and the second device comprises a user equipment. The first device may comprise a user equipment and the second device comprises a radio access network node. The request may be transmitted on a downlink shared channel or an uplink shared channel. The location information may be received on an uplink shared channel or a downlink shared channel. The request may be an activation trigger in a MAC subheader. The activation trigger may be a single bit. The request may comprise a reporting rate field identifying a minimum rate for the second device to update the location information. The request may comprise a location information type field identifying a specific information type for the second device to transmit the location information. The MAC control element of the request may comprise a fixed size MAC control element. The MAC control element of the request may comprise a variable size MAC control element. The method may comprise transmitting by the first device a radio resource control reconfiguration request, where the radio resource control reconfiguration request comprises configuration information for the second device to establish a signaling exchange procedure for positioning purposes with given parameters. The method may comprise receiving by the first device from the second device a response to the radio resource control reconfiguration request. The first device may comprise a distributed unit of a logical split base station, and the method further comprising receiving by the distributed unit from a central unit of the logical split base station a UE CONTEXT MODIFICATION REQUEST message in a F1 Application Protocol to set parameters in the distributed unit for the request. The method may comprise transmitting the location information by the first device to a target node for a hand-over.

An example embodiment may be provided in an apparatus comprising: at least one processor; and at least one non-transitory memory including computer program code, the at least one memory and the computer program code configured to, with the at least one processor, cause the apparatus to: transmit a request by the apparatus to a second device; and receiving by the apparatus from the second device, in response to the request, location information regarding a location of the second device, where the request is transmitted by the apparatus with a MAC control element and/or the location information is received by the apparatus with another MAC control element.

The apparatus may comprise a radio access network node and the second device comprises a user equipment. The apparatus may comprise a user equipment and the second device comprises a radio access network node. The apparatus may be configured to transmit the request on a downlink shared channel or an uplink shared channel. The apparatus may be configured to receive the location information on an uplink shared channel or a downlink shared channel. The request may be an activation trigger in a MAC subheader. The activation trigger may be a single bit. The request may comprise a reporting rate field identifying a minimum rate for the second device to update the location information. The request may comprise a location information type field identifying a specific information type for the second device to transmit the location information. The MAC control element of the request may comprise a fixed size MAC control element. The MAC control element of the request may comprise a variable size MAC control element. The apparatus may be configured to transmit a radio resource control reconfiguration request, where the radio resource control reconfiguration request comprises configuration information for the second device to establish a signaling exchange procedure for positioning purposes with given parameters. The apparatus may be configured to receive from the second device a response to the radio resource control reconfiguration request. The apparatus may comprise a distributed unit of a logical split base station, and the apparatus is configured to receive by the distributed unit from a central unit of the logical split base station a UE CONTEXT MODIFICATION REQUEST message in a F1 Application Protocol to set parameters in the distributed unit for the request. The apparatus may be configured to transmit the location information by the apparatus to a target node for a hand-over.

An example embodiment may be provided in a non-transitory program storage device readable by a machine, tangibly embodying a program of instructions executable by the machine for performing operations, the operations comprising: transmitting a request by a first device to a second device; and receiving by the first device from the second device, in response to the request, location information regarding a location of the second device, where the request is transmitted by the first device with a MAC control element and/or the location information is received by the first device with another MAC control element.

An example embodiment may be provided in an apparatus comprising: means for transmitting a request by the apparatus to a second device; and means for receiving by the apparatus from the second device, in response to the request, location information regarding a location of the second device, where the request is transmitted by the apparatus with a MAC control element and/or the location information is received by the apparatus with another MAC control element.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. A method comprising:
   receiving a request by a first device from a second device; and
   in response to receiving the request, transmitting by the first device location information regarding a location of the first device to the second device,
   where the request is received by the first device with a medium access control (MAC) control element and the location information is transmitted by the first device with another MAC control element,
   where the request comprises a reporting rate field identifying a minimum rate for the first device to update the location information, the method further comprising transmitting the location information by the first device to a target node for a handover.

2. The method of claim 1, where the first device comprises a user equipment and the second device comprises a radio access network node, and where the MAC control element is identified by a MAC subheader with a specific logical channel ID (LCID) and the MAC control element conveys information, the information comprising a reporting rate of the location information and location information type, the location information type comprising encoding of coordinates, positioning accuracy, and the positioning method used.

3. The method of claim 1, where the first device comprises a radio access network node and the second device comprises a user equipment, and where the MAC control element comprises a variable size corresponding to variable location information type and reporting rate fields, where an exact size of the fields depends on the request.

4. The method of claim 1, where the request comprises activation triggers in a MAC subheader, where the activation triggers comprise estimated mobility trajectories for predictive beam switching and a Reference Signal Received Power (RSRP) indicates that the first device is at a cell edge or between beam areas.

5. The method of claim 1, where the request comprises a location information type field identifying a specific information type for the first device to transmit in the location information.

6. An apparatus comprising:
   at least one processor; and
   at least one non-transitory memory including computer program code, the at least one memory and the computer program code configured to, with the at least one processor, cause the apparatus at least to:
   receive a request from a second device; and
   in response to receiving the request, transmit location information regarding a location of the apparatus to the second device,
   where the request is received by the apparatus with a medium access control (MAC) control element and the location information is transmitted by the apparatus with another MAC control element,
   where the apparatus is further caused to retrieve real-time coordinates from an application layer in the apparatus for use as the location information, and encode the location information for transmission in the another MAC control element,
   where the apparatus is caused to further transmit the location information by the first device to a target node for a handover.

7. The apparatus of claim 6, where the apparatus comprises a user equipment and the second device comprises a radio access network node, and where the MAC control element is identified by a MAC subheader with a specific logical channel ID (LCID) and the MAC control element conveys information, the information comprising a reporting rate of the location information and location information type, the location information type comprising encoding of coordinates, positioning accuracy, and the positioning method used.

8. The apparatus of claim 6, where the apparatus comprises a radio access network node and the second device comprises a user equipment, and where the MAC control element comprises a variable size corresponding to variable location information type and reporting rate fields, where an exact size of the fields depends on the request.

9. The apparatus of claim 6, where the apparatus is caused to receive the request on a downlink shared channel or an uplink shared channel.

10. The apparatus of claim 6, where the apparatus is caused to transmit the location information on an uplink shared channel or a downlink shared channel.

11. The apparatus of claim 6, where the request comprises an activation trigger in a MAC subheader, where the activation triggers comprise estimated mobility trajectories for predictive beam switching and a Reference Signal Received Power (RSRP) indicates that the first device is at a cell edge or between beam areas.

12. The apparatus of claim 11, where the activation trigger is a single bit.

13. The apparatus of claim 6, where the request comprises a reporting rate field identifying a minimum rate for the apparatus to update the location information.

14. The apparatus of claim 6, where the request comprises a location information type field identifying a specific information type for the apparatus to transmit in the location information.

15. The apparatus of claim 6, where the apparatus is caused to further receive a radio resource control reconfiguration request from the second device, where the radio resource control reconfiguration request comprises configuration information for the apparatus to establish a signaling exchange procedure with given parameters for positioning purposes.

16. The apparatus of claim 15, where the apparatus is further caused to transmit to the second device a response to the radio resource control reconfiguration request.

17. The apparatus of claim 6, where the MAC control element of the request comprises a fixed size MAC control element.

18. The apparatus of claim 6, where the MAC control element of the request comprises a variable size MAC control element.

19. An apparatus comprising:
   at least one processor; and
   at least one non-transitory memory including computer program code, the at least one memory and the computer program code configured to, with the at least one processor, cause the apparatus to:
   transmit a request to a second device; and
   receiving from the second device, in response to the request, location information regarding a location of the second device,
   where the request is transmitted by the apparatus with a medium access control (MAC) control element and the location information is received by the apparatus with another MAC control element,
   where the request comprises a reporting rate field identifying a minimum rate for the first device to update the location information,
   the method further comprising transmitting the location information by the second device to a target node for a handover.

* * * * *